(12) United States Patent
Power

(10) Patent No.: US 7,830,265 B2
(45) Date of Patent: Nov. 9, 2010

(54) SLEEP ALERT DEVICE

(76) Inventor: Jerome Arnold Power, 4116 Lark Bunling Ct., Southport, NC (US) 28461

(\*) Notice: Subject to any disclaimer, the term of this patent is extended or adjusted under 35 U.S.C. 154(b) by 0 days.

(21) Appl. No.: 12/705,798

(22) Filed: Feb. 15, 2010

(65) Prior Publication Data
US 2010/0141415 A1 Jun. 10, 2010

Related U.S. Application Data

(63) Continuation-in-part of application No. 11/391,652, filed on Mar. 28, 2006, now Pat. No. 7,688,213.

(51) Int. Cl.
G08B 23/00 (2006.01)
(52) U.S. Cl. ..................................... 340/575
(58) Field of Classification Search ................. 340/575, 340/576; 180/271, 272; 73/379.02
See application file for complete search history.

(56) References Cited

U.S. PATENT DOCUMENTS

| | | | | |
|---|---|---|---|---|
| 4,210,905 | A * | 7/1980 | Coons | 340/575 |
| 4,361,834 | A * | 11/1982 | King | 340/575 |
| 4,488,726 | A * | 12/1984 | Murray | 473/202 |
| 5,585,785 | A | 12/1996 | Gwin et al. | |
| 5,681,993 | A | 10/1997 | Heitman | |
| 5,969,616 | A | 10/1999 | Tschoi | |
| 6,016,103 | A | 1/2000 | Leavitt | |
| 6,067,020 | A | 5/2000 | Wimmer | |
| 6,107,922 | A | 8/2000 | Bryuzgin | |
| 6,172,610 | B1 | 1/2001 | Prus | |
| 6,218,947 | B1 | 4/2001 | Sutherland | |
| 6,559,770 | B1 | 5/2003 | Zoerb | |
| 6,590,499 | B1 | 7/2003 | D'Agosto | |
| 6,791,462 | B2 * | 9/2004 | Choi | 340/575 |
| 6,946,965 | B2 * | 9/2005 | Young et al. | 340/575 |

FOREIGN PATENT DOCUMENTS

| | | |
|---|---|---|
| CN | 03259607 | 8/2004 |
| DE | 3741649 A1 | 6/1989 |
| DE | 10041116 A1 | 7/2001 |

(Continued)

OTHER PUBLICATIONS

European Search Report for EP Application 06739837.0, Sep. 8, 2009.

(Continued)

*Primary Examiner*—Phung Nguyen
(74) *Attorney, Agent, or Firm*—Jim Passá; Passá Intellectual Property, LLC

(57) ABSTRACT

The present invention relates to a sleep alert device that acts by pressure of the fingers of the user on sensors. The invention includes a limited number of sensors as well as an instant alarm system which prevents accidental problems with previous delay alarm systems. At least one sensor is mounted on the fingers of the user or the steering wheel and with no delay of any kind connected directly or wirelessly to a control panel for control of the pressure sensors. The device has a means for detecting the wearing by the user, such as a pulse detector which can tell if the device is on or off when a pulse is detected respectively.

20 Claims, 4 Drawing Sheets

FOREIGN PATENT DOCUMENTS

GB          2371395 A      1/2001

OTHER PUBLICATIONS

Bolton, Friends don't let friends drive drowsy, Findings ay Baylor College of Medicine, Houston, Texas, US, Apr. 2005, vol. 03, Issue 04, http://www.bcn.edu/findings/vol3/is4/05apr_n1.htm.

The Volvo Owners Club, World breakthrough from Volvo Cars alerts tired and unconcentrated drivers, Nov. 30, 2005, http://www.volvoclub.org.uk/press/releases/idnr737.shtml.

* cited by examiner

SLEEP ALERT DEVICE

CROSS-REFERENCE TO RELATED APPLICATIONS

This application is a continuation-in-part of U.S. patent application Ser. No. 11/391,652 filed on Mar. 28, 2006 now U.S. Pat. No. 7,688,213 and is included herein in its entirety by reference.

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

1. Field of the Invention

The present invention relates to sleep detection warning devices and more particularly, it pertains to a novel sleep alert warning system for waking a dozing driver.

2. Description of Related Art

Drivers of motor vehicles, especially truck drivers, often put in long grueling hours at the wheel of their vehicle. Because of the need or desire to reach a given destination at a given time, it is not infrequent that drivers spend more time at the wheel than is reasonably prudent and safe, or spend time driving fatigued long past when they should be asleep. It is not surprising then that motor vehicle accidents occur where the driver has dozed off at the wheel and where the vehicle has veered off the road. Accidents result not only in vehicle damage, property damage, and severe injury or death of the driver; it can also result in the death or injury of other drivers or pedestrians in the area of the accident. According to the National Highway Traffic Safety Administration, there are about 100,000 police-reported crashes that are the direct result of driver fatigue each year. Accidents that occur when the driver falls asleep at the wheel often have a high percentage of fatality. NHTSA conservatively estimates fatigue-related crashes result in an estimated 1,550 deaths, 71,000 injuries, and $12.5 billion in monetary losses each year. In Europe too, the situation is very similar. The German Insurance Association—GDV (Gesamtverband der Deutschen Versicherungswirtschaft e.V.)—estimates that about 25 percent of all fatal accidents on German motorways are caused by tiredness. The National Drowsy Driving Act of 2003's 2008 figures for large trucks and buses is 4,505 fatalities and 113,000 injuries due to fatigue.

A number of systems have been developed to attempt to alert the driver who is falling asleep. Volvo is introducing a complex system of cameras, sensors, processors, and computer controls for their consumer based automobiles to alert when a driver has become fatigued by measuring the movement of the car. It apparently only works when the vehicle is traveling 60 KPH or more. The device works independent of the driver, and depends on complex calculations without actually knowing the condition of the driver.

Eye and head movements have been associated with fatigue and some solutions have revolved around devices that utilize this information. In U.S. Pat. No. 6,107,922 to Bryuzgin issued Aug. 22, 2000, a self contained headset is described. The device monitors the position of a driver's lower jaw as an indicator of the driver's condition. The device is triggered when the driver's jaw moves downward triggering an alarm condition. The device relies on motion that could also occur during talking or head movement, and isn't necessarily the first motion indicator of a tired driver. In U.S. Pat. No. 6,559,770 to Zoerb, a safety apparatus utilizing an eyeglass mounted light beam emitter and detector which will sound an alarm, when a drowsy driver's eye closes and his eyelashes interrupt a focused light beam is described. The device requires accurate alignment and calibration, and is affected by both exterior light sources and well as head movements and blink pattern.

It is known that as a driver fatigues, his grip on the steering wheel relaxes. Measurement of grip has been measured by devises which mount on the steering wheel, and those that mount on the hand. In U.S. Pat. No. 6,218,947 to Sutherland issued Apr. 17, 2001, describes a sleep alarm mounted on the steering wheel comprising a pair of conductive elements that measure conductive capacitance between the two hands on the steering wheel. The difference is used to establish a baseline which when changed, initiates an alarm.

In U.S. Pat. No. 6,016,103 to Leavitt issued Jan. 18, 2000, there is at least one pressure sensor on each of the two gloves. The sensors can be positioned on any of the fingers (shown on the finger tips) or the palm of the hand. There is a remote communication means between the two gloves, and an alarm is activated when grip pressure of both hands falls below a threshold level. The device requires the driver's grip to be relaxed on both hands to be triggered, and the device has a preferred embodiment where grip pressure has to fall below a threshold for a given period of time. In U.S. Pat. No. 6,172,610 to Prus issued Jan. 9, 2001, there is described a contact means where there is a sensor mounted on a glove, and a contact mounted on the steering wheel. As long as the glove and wheel sensors are in contact, the alarm does not sound. Contact is measured by the driver's skin resistance rather than pressure, and has been considered unreliable since the ambient temperature differences effect perspiration, and thus, alter skin resistance readings. In U.S. Pat. No. 6,590,499 to D'Agosto, describes a steering wheel mounted alert system. It requires either a custom manufactured steering wheel, or custom installation, and requires the steering wheel to be firmly griped to be activated.

While it is clear that each of these devices fulfill a particular objective or requirement, it is clear that each has particular limitations, and in general, are either extraordinarily complex or do not activate an alarm until the driver has already started to dose off. It would be useful if there was a sensor arrangement which sounded an alarm instantly, when the driver starts to doze and not when he is asleep. It would be useful if the system were simple and operated with a minimum of complicated interactions.

BRIEF SUMMARY OF THE INVENTION

It is an object of the present invention to provide a novel device that has addressed the above problems along with other benefits to the user which will become evident from the disclosure and examples described herein. The present invention is relatively simple to use, activates immediately if a driver starts to nod off, can easily be turned off for repositioning or other activities, and is cost effective compared to other systems.

In one embodiment of the present invention, there is disclosed a sleep alert device for use by a driver while driving a vehicle comprising:

a) at least one pressure sensor positioned for determining the grip pressure on the vehicle steering wheel;

b) an alarm which is activated immediately when the grip pressure on any one sensor falls below a predetermined value;
c) a means for turning the sensors on or off; and
d) a means for determining if the device is being worn by the driver.

DETAILED DESCRIPTION OF THE INVENTION

Figure 1:
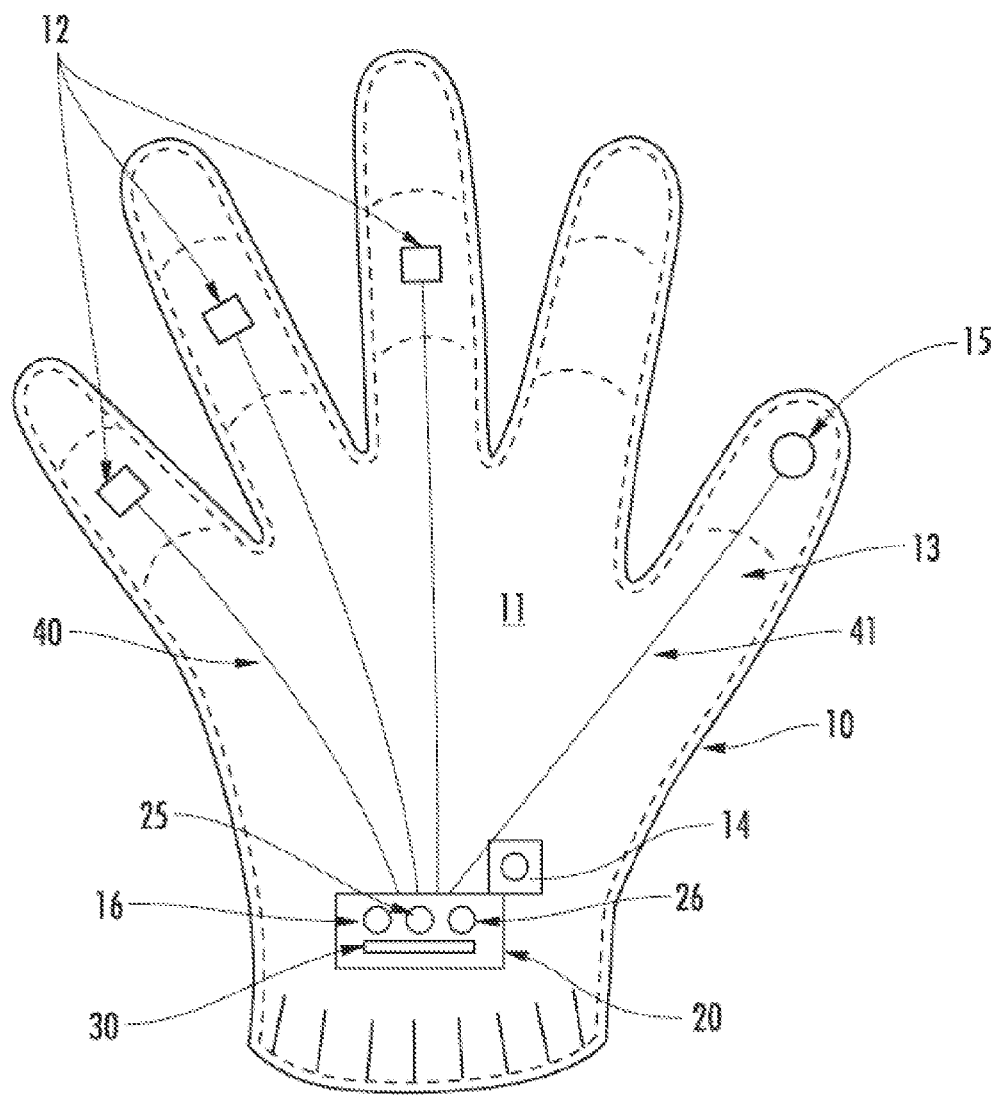
FIG. 1 shows a perspective of the invention attached to a glove with sensors on the palmar aspect.

While this invention is susceptible to embodiment in many different forms, there is shown in the drawings, and will herein, be described in detail specific embodiments, with the understanding that the present disclosure of such embodiments is to be considered as an example of the principles, and not intended to limit the invention to the specific embodiments shown and described. In the description below, like reference numerals are used to describe the same, similar, or corresponding parts in the several views of the drawings. This detailed description defines the meaning of the terms used herein, and specifically describes embodiments in order for those skilled in the art to practice the invention.

DEFINITIONS

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", and "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or", as used herein, is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps, or acts are in some way inherently mutually exclusive.

The drawings featured in the figures are for the purpose of illustrating certain convenient embodiments of the present invention, and are not to be considered as limitation thereto. Term "means" preceding a present participle of an operation indicates a desired function for which there is one or more embodiments, i.e., one or more methods, devices, or apparatuses for achieving the desired function, and that one skilled in the art could select from these or their equivalent in view of the disclosure herein, and use of the term "means" is not intended to be limiting.

As used herein "vehicle" refers to any transportation means in which a driver holds on to a steering wheel, such as an automobile, a truck, a train, an airplane, or the like. As can be seen a "wheel" refers to any device the driver of the vehicle holds to operate the vehicle. Thus, a control stick, an airplane yolk, a speed controller on an electric train, or the like, are all considered steering wheels for the purposes of this patent, even if they only control speed or the like. A "driver" refers to the operator of the vehicle regardless if the driver is actually steering the wheel or just operating the speed of the vehicle.

As used herein "sleep alert device" refers to a device designed to alert the user, when they are falling asleep in order to prevent the user from falling asleep. This is most useful while driving a vehicle where if the driver even begins to nod off, the sleep alert device can sound an alarm, which will prevent the driver from falling asleep and prevent an accident.

As used herein "pressure sensor" refers to electronic pressure sensor pads known in the art, which can be used to measure the pressure between the steering wheel and the user's fingers, when the pressure sensor is mounted either on the fingers of the driver's hand or on the steering wheel. In one embodiment, there is between one and three sensors, and in yet another embodiment, there is just one sensor. In other embodiments, there are more than three sensors. In yet another embodiment, there are sensors on both hands. Pressure sensors are normally connected to a microprocessor or the like, and this can be assembled as in the figures which follow by a direct wire connection, but with today's miniaturization of components could be done by RF, Bluetooth, or other wireless means. The pressure sensor could be a simple on/off switch mechanism or could be, in one embodiment, a timer which turns the unit on or off after a given period of driving. The pressure sensor could also be a variable pressure sensor with the ability to set limits for the sensor. The pressure sensor could be connected directly to the alarm via wired or wireless means. The ideal mounting position for the pressure sensors on the fingers in one embodiment is on the middle, ring and/or little finger. In one embodiment, the sensor is placed on the part of the finger which most likely comes in contact with the steering wheel, which would be on the palm side of the finger between the distal interphalangeal joint and the metacarpo-phalangeal joint of the finger. In other embodiments, one or more sensors are placed on the steering wheel for grasping during use.

As used herein "at least one pressure sensor" refers to attaching a pressure sensor to one or more of the fingers of at least one hand, or is mounted on the steering wheel in at least one position. In one embodiment, they are mounted on one or more fingers of one hand, in yet another embodiment, to a single finger on a single hand. Where all the sensors will be on a single hand, it leaves one hand free to pause the device, operate other devices, and in general, be free to do whatever the driver wishes. In one embodiment, the means can be a glove where the sensor is attached to the glove on the palm side, such that the sensor comes in contact with the steering wheel while the glove is worn during driving. In one embodiment, the thumb and index finger do not have sensors mounted or where there are less than 3 sensors, there could be a glove with only the number of fingers in the glove corresponding to the number of sensors, e.g., 3 fingers where there are three sensors.

There are several controls which can be mounted on the hand directly, on a glove or other hand worn covering, a strap, or can be attached to the steering wheel, dash, or other portion of the car, for example, by wireless mean. They can be mounted together, or any of the controls can be separated from the rest and mounted as desired.

As used herein "alarm" refers to a means for shaking or rousing a dozing driver from his about to be sleeping state. This could be an audio alarm, a vibratory means, or the like which would startle the driver just enough to bring him back from the brink of sleep. In one embodiment, this may be a buzzer or other audio device. The alarm would be connected to the microprocessor or the pressure sensor directly, and be triggered when the pressure applied to the sensor drops below a given threshold level. In one embodiment, there could be an adjustment means for adjusting the level at which the alarm is triggered. It is an embodiment of this invention that there not be a delay in activation of the alarm built into the mechanism, as for example as taught in U.S. Pat. No. 6,016,103. A delay would mean that the driver could have already driven off the road, crashed, and been killed before the alarm would be triggered.

As used herein "pause means" refers to a switch or other means for deactivating the device while in use for repositioning the hands, or the like. It can consist of an on/off switch, and in fact be the power switch, but in one embodiment, it is a separate switch which allows the device to remain powered while momentarily deactivating the ability of the alarm to sound. The switch can be a momentary or spring loaded switch, can be a gravity activated switch, or the like.

As used herein a "means for determining if the device is being worn by the driver" refers to any device or the like which functions to let the device know it is being worn. Such device could include a pulse detecting device which would check for a pulse, and assume if there is no pulse, the device is not being worn and turn the device off. The pulse alarm can also be used to turn the device on as soon as a pulse is detected. The device can also have a separate off button or on/off button. With an off button, the device can be turned off even if the pulse is detected. Other less sophisticated means could be used as well, such as, when the device is placed on the hand snaps which attach the device, indicate it is being worn. Such devices work, but are easier to defeat than a pulse meter. Other means for determining if the device is being worn, could be envisioned in view of the present invention, and are individual embodiments of the present invention. It is clear that one could defeat these means, however, it is unlikely the device would be worn by the person not driving.

Now referring to the drawings, in an embodiment shown in the drawing, FIG. 1 is a perspective of the invention 10 attached to a glove 11 with sensors on the palmar aspect. The driver places glove 11 on his hand. Pulse detector 14 detects the pulse of the driver and turns the device on. On/off button 16 or which can be just an off button as shown, deactivates the device. Additional switch 15 depicted on the thumb 13 of glove 11 can be a pause means, an on or off switch, or both. Control panel 20 for mounting controls is shown in this embodiment on the palm (palmar) side of the glove 11. The control panel 20 can be mounted in any convenient location and in a different embodiment not shown in FIG. 1; it is mounted on the back side of the glove 11. Also on control panel 20, is pressure control switch 25 for controlling the amount of pressure which activates the invention. Lastly, shown is adjustable volume switch 26 for adjusting the volume of the alarm 30. Alarm 30 in this embodiment is shown as a hashed area, indicating that the alarm has a speaker means for some kind to sound. A battery can be inserted, if necessary, into the control panel 20 or anywhere according to the art.

Lastly, connecting wires 40 and 41 represent the electrical connection between the sensors 12 and pause button 15 respectively.

Figure 2:
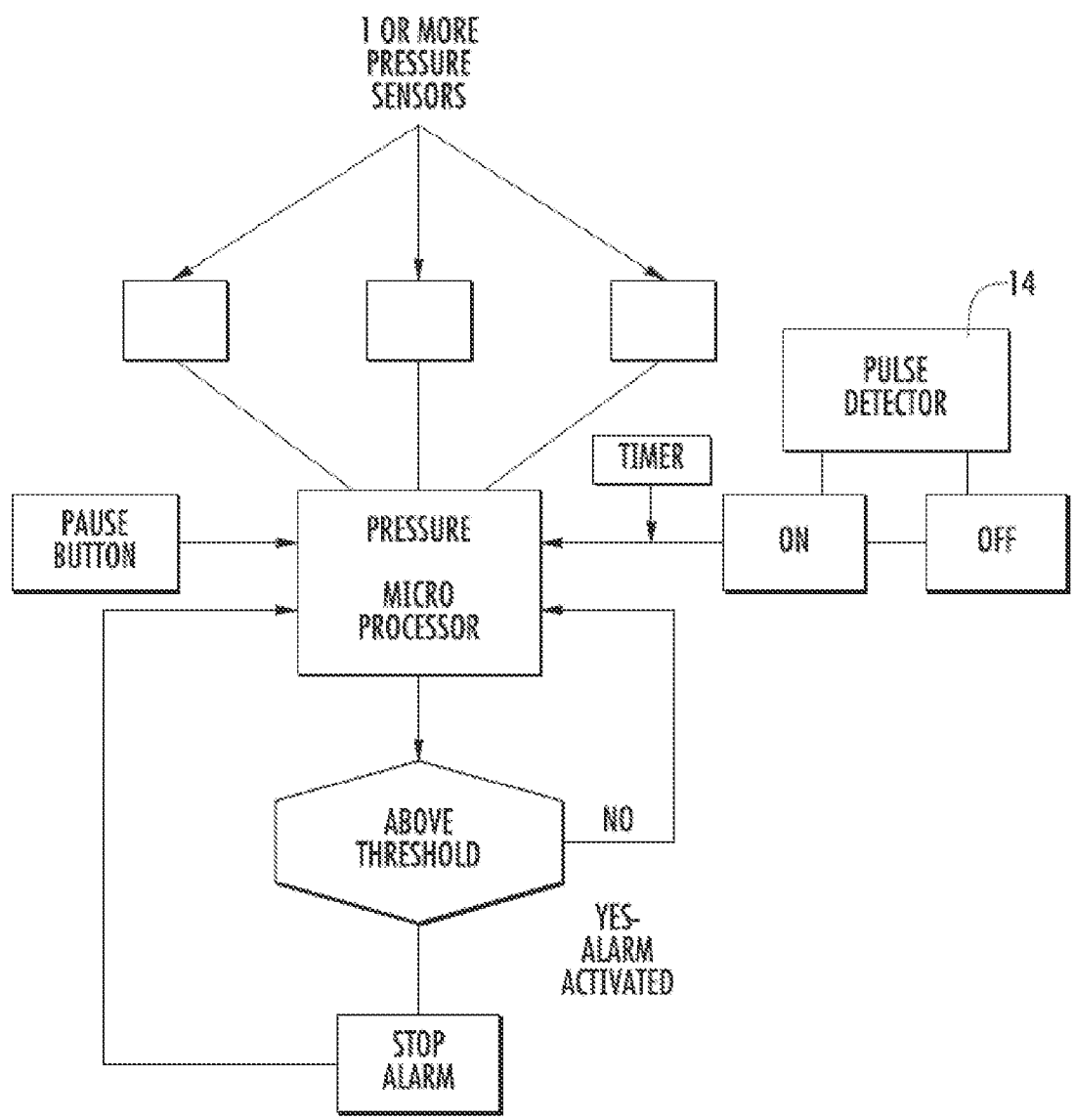
FIG. 2 is a flow chart showing the operation of the circuit of the invention.

FIG. 2 represents a flow diagram of the workings of the present invention. The flow diagram indicates the instantaneous nature of the sensor of the invention as well as the ultimate simplicity. It indicates in a flow method that the pulse meter 14 controls the on function while it can also control the off function, and the on/off can function separately from the pulse meter 14.

Figure 3:
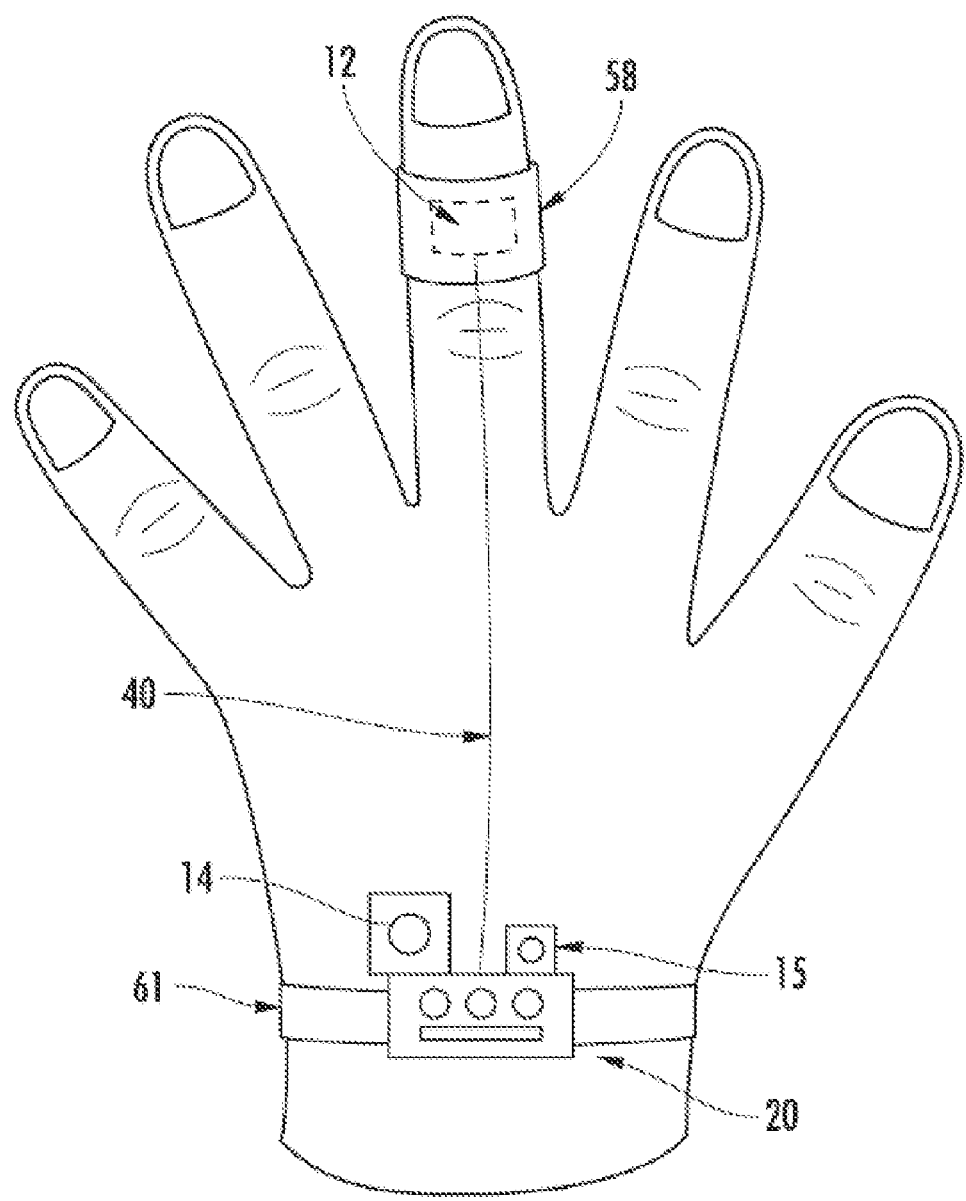
FIG. 3 is a perspective of the invention mounted to a single finger and without a glove.

FIG. 3 is yet another embodiment of the invention. This embodiment is where the sensor 12 is mounted via use of finger strap 58. In this view, the sensor 12 is on the palm side of the hand. The control panel 20 is attached to the user's hand via wrist strap 61. In other embodiments, the control panel 20 could be miniaturized and placed on the finger strap. In this embodiment, pause button 15 is mounted on the control panel. On/off Switch 16, pressure control switch 25 and alarm volume control 26 are as previously described. The pulse detector 14 is shown on the back side of the hand, but could easily be on the palm side where pulse detection is easier than the location shown.

Figure 4:
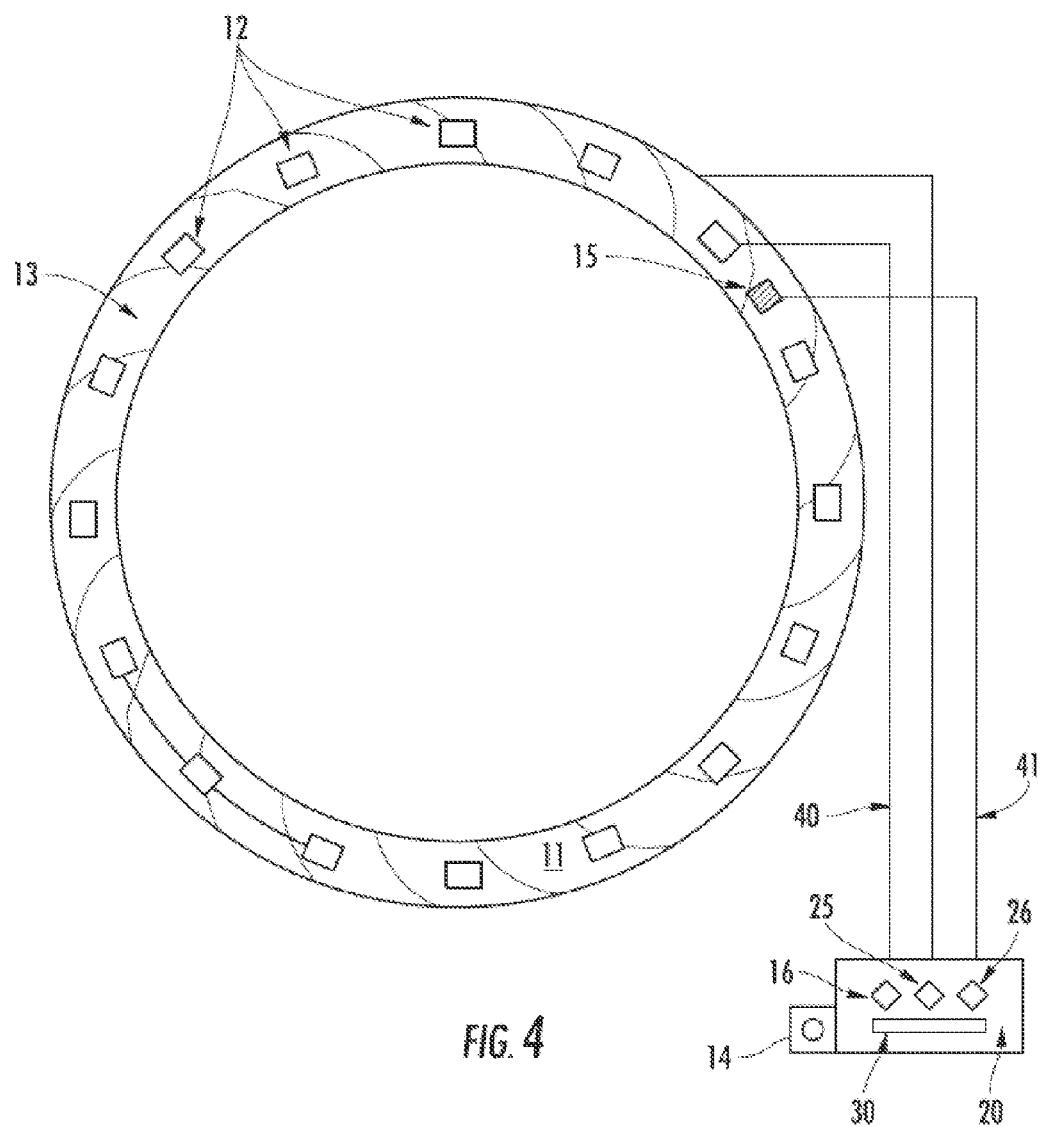
FIG. 4 is a frontal perspective showing the mounting of the sensors on the steering wheel.

FIG. 4 depicts another embodiment of the present invention where there are a plurality of pressure sensors 12 mounted on a steering wheel 13. All other features are the same as in other embodiments.

It is understood that wired connection 40 could also represent a wireless connection within the skill in the art. Accordingly, the pause mechanism connection 41 could also be wireless.

Accordingly, a novel approach to producing a driver sleep alert device is now disclosed which overcomes many of the problems and faults of previous devices. One skilled in the art will be able to produce variations, and other embodiments within the scope of the invention in view of the above disclosure. The disclosure is thus not intended to be limiting or all inclusive, and the broadest possible interpretation is intended in the claims which follow, though each embodiment can stand on its own.

What is claimed is:

1. A sleep alert device for use by a driver while driving a vehicle comprising:
 a) at least one pressure sensor positioned for determining the grip pressure on the vehicle steering wheel;
 b) an alarm which is activated immediately when the grip pressure on any one sensor falls below a predetermined value;
 c) a means for turning the device off; and
 d) a means for determining if the device is being worn by the driver which turns the device on.

2. The sleep alert device according to claim 1 wherein the means for determining if the device is being worn is a pulse monitor.

3. The sleep alert device according to claim 1 wherein the alarm is located in a wrist band worn by the driver.

4. The sleep alert device according to claim 3 wherein the device is turned on by attaching the wrist band.

5. The sleep alert device according to claim 4 wherein there is a pulse meter in the wrist band and the device remains on only so long as a pulse is detected.

6. The sleep alert device according to claim 1 wherein there is a means for recording the operating readings of the means for determining if the device is being worn by the driver.

7. The sleep alert device according to claim 1 which consists of a single pressure sensor.

8. The sleep alert device according to claim 1 wherein the at least one sensor is positioned on the fingers between the distal interphalangeal joint and the metacarpo-phalangeal joint.

9. The sleep alert device according to claim 1 which further comprises a pause means.

10. The sleep alert device according to claim 9 further wherein the pause means is mounted on one of the fingers, such that the device can be paused by the hand the device is mounted on without reducing pressure on the pressure sensors.

11. The sleep alert device according to claim 1 wherein the on off switch can be controlled by a timer.

12. The sleep alert device according to claim 1 wherein all the means for controlling the device are mounted on a means for attaching the sensors to the fingers.

13. The sleep alert device according to claim 1 wherein at least the alarm is connected wirelessly to the pressure sensors.

14. The sleep alert device according to claim 1 which further comprises an automated means for turning the device on at a pre-selected interval of time.

15. The sleep alert device according to claim 1 which further comprises a means for adjusting the pressure at which the alarm is activated.

16. The sleep alert device according to claim 1 wherein the device cannot be turned on unless the device detects it is being worn by the driver.

17. The sleep alert device according to claim 1 wherein the at least one pressure sensor is mounted on a means for attaching the sensor to one or more of the fingers of one hand.

18. The sleep alert device according to claim 17 wherein the means for attaching the sensors to the fingers of one hand is a glove.

19. The sleep alert device according to claim 17 wherein the means for attaching the sensors to the fingers is a strap that wraps around at least one finger.

20. The sleep alert device according to claim 1 wherein the at least one pressure sensor is mounted on the steering wheel.

* * * * *

UNITED STATES PATENT AND TRADEMARK OFFICE
CERTIFICATE OF CORRECTION

PATENT NO.        : 7,830,265 B2                                              Page 1 of 1
APPLICATION NO.   : 12/705798
DATED             : November 9, 2010
INVENTOR(S)       : Jerome Arnold Power It is certified that error appears in the above-identified patent and that said Letters Patent is hereby corrected as shown below:

Title Page item 63
Related U.S. Application Data shown as:
Continuation-in-part of application No. 11/391,652, filed on Mar. 28, 2006, now Pat. No. 7,688,213.

Related U.S. Application Data should read:
Continuation-in-part of application No. 11/391,652, filed on Mar. 28, 2006, now Pat. No. 7,688,213, which claims priority of provisional application No. 60/678,881, filed on May 6, 2005.

Title Page item 74
Attorney, Agent, or Firm shown as;
Jim Passá; Passá Intellectual Property, LLC.

Attorney, Agent, or Firm should read:
Jim Passé; Passé Intellectual Property, LLC.

Signed and Sealed this
Twenty-eighth Day of December, 2010

David J. Kappos
*Director of the United States Patent and Trademark Office*